United States Patent
Zhang et al.

(10) Patent No.: US 9,619,388 B2
(45) Date of Patent: Apr. 11, 2017

(54) METHOD FOR MANAGING CACHE DATA OF A MOBILE TERMINAL, MOBILE TERMINAL, AND SERVER

(71) Applicant: TENCENT TECHNOLOGY (SHENZHEN) COMPANY LIMITED, Shenzhen (CN)

(72) Inventors: Bifeng Zhang, Shenzhen (CN); Huafeng Ma, Shenzhen (CN); Qiliang Shen, Shenzhen (CN); Shili Lin, Shenzhen (CN); Xiao Xiao, Shenzhen (CN); Tongyi Guo, Shenzhen (CN); Kun Zhang, Shenzhen (CN)

(73) Assignee: Tencent Technology (Shenzhen) Company Limited, Shenzhen, Guangdong (CN)

( * ) Notice: Subject to any disclaimer, the term of this patent is extended or adjusted under 35 U.S.C. 154(b) by 55 days.

(21) Appl. No.: 14/737,614

(22) Filed: Jun. 12, 2015

(65) Prior Publication Data

US 2015/0278098 A1    Oct. 1, 2015

Related U.S. Application Data

(63) Continuation of application No. PCT/CN2013/090046, filed on Dec. 20, 2013.

(30) Foreign Application Priority Data

Dec. 21, 2012   (CN) .......................... 2012 1 0562756

(51) Int. Cl.
*G06F 12/00* (2006.01)
*G06F 12/0831* (2016.01)
(Continued)

(52) U.S. Cl.
CPC .......... *G06F 12/0833* (2013.01); *G06F 12/12* (2013.01); *H04L 67/2842* (2013.01); *G06F 2212/62* (2013.01)

(58) Field of Classification Search
CPC ............................. G06F 12/0833; G06F 12/12
(Continued)

(56) References Cited

U.S. PATENT DOCUMENTS

| | | | |
|---|---|---|---|
| 6,760,813 B1 * | 7/2004 | Wu | G06F 12/121 707/999.003 |
| 2001/0001872 A1 * | 5/2001 | Singh | G06F 12/0802 711/129 |

(Continued)

FOREIGN PATENT DOCUMENTS

| | | |
|---|---|---|
| CN | 1525318 A | 9/2004 |
| CN | 101358851 A | 2/2009 |

(Continued)

OTHER PUBLICATIONS

International Search Report for International Application No. PCT/CN2013/090046, dated Mar. 27, 2014.

*Primary Examiner* — Jae Yu
(74) *Attorney, Agent, or Firm* — Harness, Dickey & Pierce, P.L.C.

(57) ABSTRACT

A method for managing cache data of a mobile terminal includes determining whether first cache data corresponds to an application exists. If it is determined that the first cache data does not exist, a data request is sent to request server data corresponding to the first cache data, the server data is downloaded, forming the first cache data by using the downloaded server data.

9 Claims, 4 Drawing Sheets

(51) Int. Cl.
*H04L 29/08* (2006.01)
*G06F 12/12* (2016.01)

(58) Field of Classification Search
USPC .......................................................... 711/135
See application file for complete search history.

(56) References Cited

U.S. PATENT DOCUMENTS

2005/0154759 A1    7/2005  Hofmeister et al.
2009/0291696 A1*  11/2009  Cortes .................... H04W 4/00
                                                              455/466

FOREIGN PATENT DOCUMENTS

| CN | 101605186 A | 12/2009 |
|----|-------------|---------|
| CN | 101719073 A | 6/2010  |

\* cited by examiner

METHOD FOR MANAGING CACHE DATA OF A MOBILE TERMINAL, MOBILE TERMINAL, AND SERVER

CROSS-REFERENCE TO RELATED APPLICATIONS

This application is a continuation of International Application No. PCT/CN2013/090046, filed Dec. 20, 2013. This application claims the benefit and priority of Chinese Application No. 201210562756.6, filed Dec. 21, 2012. The entire disclosures of each of the above applications are incorporated herein by reference.

FIELD

The present disclosure relates to communications technologies and to a method for managing cache data of a mobile terminal, a mobile terminal, and a server.

BACKGROUND

This section provides background information related to the present disclosure which is not necessarily prior art.

Recently, technology regarding mobile terminals (e.g., smart phones) has developed rapidly. When users enjoy the convenience of a mobile terminal, they also experience the cache of the mobile terminal is progressively more occupied, which influences the running speeds of system software and application software on the mobile terminal. In the traditional art, when a mobile terminal, such as a smart phone, is in an environment without a network, the application software thereof often accesses data cached locally. The local cache data is not preferentially loaded according to the user's habit, thus, it may be slow to find the cache data, which may negatively influence the user's experience. Further, the user has to frequently clean the cache to prevent the data in the cache from occupying too much system storage space. In an environment with a network, application software may often download related data from a server. This process occupies the bandwidth heavily and wastes network resources. Further, the download speed may be affected by the network environment.

SUMMARY

This section provides a general summary of the disclosure, and is not a comprehensive disclosure of its full scope or all of its features.

To address the challenges existing in the traditional art where in a mobile terminal (e.g., mobile phone), application software accesses a cache over-frequently, the speed of searching for a cache file is slow, data downloading excessive, and network flow is wasted etc., the present disclosure provides the following methods.

According to various embodiments, the present disclosure provides a method for managing cache data, including determining whether first cache data corresponding to an application exists. If it is determined that the first cache data does not exist, sending a data request for server data corresponding to the first cache data and downloading the server data and forming the first cache data by using the downloaded server data.

According to various embodiments, the present disclosure provides a mobile terminal, including memory, one or more processors, and one or more programs stored in the memory and configured for execution by the one or more processors. The one or more programs include instructions to determine whether first cache data corresponding to an application exists. If it is determined that the first cache data does not exist, send a data request for server data corresponding to the first cache data, download the server data, and form the first cache data by using the server data.

According to various embodiments, the present disclosure provides a server, including memory, one or more processors, and one or more programs stored in the memory and configured for execution by the one or more processors. The one or more programs include instructions to, if first cache data corresponding to an application does not exist; receive a data request for server data corresponding to the application and send the server data to form the first cache data.

According to the above methods, in an environment where the network condition is good, the local cache can be used according to the cache situations thereof and the expiration time returned from the server; since in some conditions, there is no need to re-download the server data, which reduces waste of network traffic. The cache file stored locally is in the form of object stream instead of the original file, which avoids a second analysis, improves the loading speed, and enhances the user's experience. The cache data of the mobile terminal takes precedence according to the frequency of usage by the user, which also improves the loading speed. The cache data is efficiently compressed, which reduces the storage space occupied by the cache data in the mobile terminal.

To make the above content of the present disclosure easily understood, the various embodiments of the present disclosure will be illustrated in conjunction with the accompanying figures, and will be described in detail as follows.

Further areas of applicability will become apparent from the description provided herein. The description and examples in this summary are intended for purposes of illustration and are not intended to limit the scope of the present disclosure.

DRAWINGS

The drawings described herein are for illustrative purposes of various embodiments and not all possible implementations, and are not intended to limit the scope of the present disclosure.

For a better understanding of the present disclosure, reference should be made to the Detailed Description below, in conjunction with the following drawings in which like reference numerals refer to corresponding parts throughout the figures.

Corresponding reference numerals indicate corresponding parts throughout the several views of the drawings.

DETAILED DESCRIPTION

Example embodiments will now be described more fully with reference to the accompanying drawings.

Reference will now be made in detail to various embodiments, which are illustrated in the accompanying drawings. In the following detailed description, numerous details are set forth in order to provide a thorough understanding of the present disclosure. The figures are illustrations of various embodiments, in which modules or procedures shown in the figures are not necessarily required for implementing the present disclosure. In other instances, well-known methods, procedures, components, and circuits have not been described in detail so as not to unnecessarily obscure aspects of the various embodiments.

Figure 1:
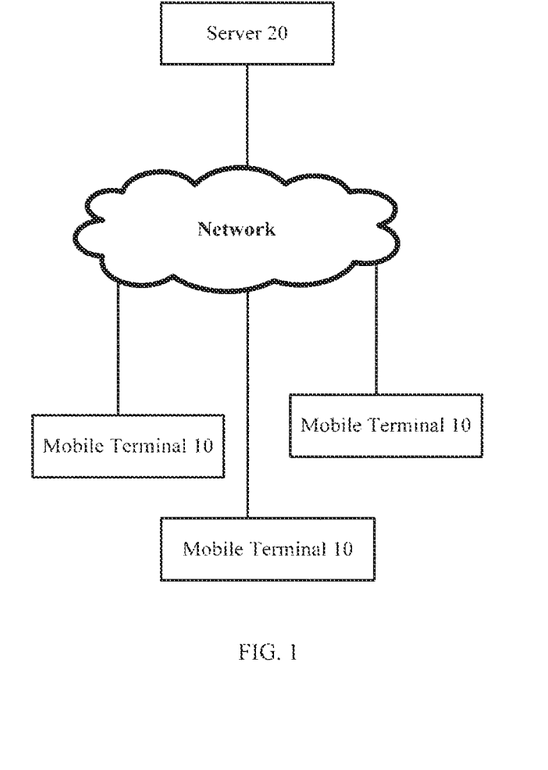
FIG. 1 shows system architecture according to various embodiments.

FIG. 1 shows system architecture according to various embodiments of the present disclosure. As seen from FIG. 1, the system includes mobile terminals 10 and a server 20 which can communicate with each other via the network. FIG. 1 is an example, and the present disclosure is not limited to this. The detailed technical scheme of the present disclosure is described as follows.

Figure 2:
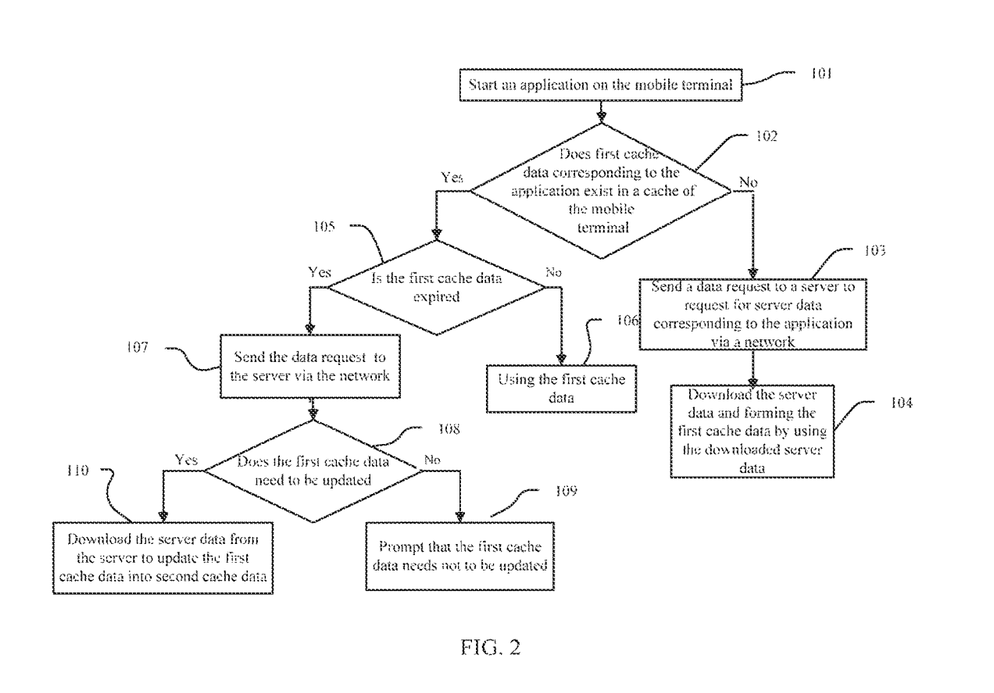
FIG. 2 shows a flow chart of a method for managing cache data of a mobile terminal according to various embodiments.

FIG. 2 shows a flowchart of a method for managing cache data of a mobile terminal according to various embodiments of the present disclosure. As seen from FIG. 2, at block 101 the mobile terminal runs an application (APP) on the mobile terminal. According to various embodiments, the application may be a third party APP.

Block 102: The mobile terminal checks a cache thereof and determines whether first cache data corresponding to the application exists in the cache. If it is determined that the first cache data does not exist in the cache of the mobile terminal, the flow goes to block 103, and if it is determined that the first cache data exists in the cache of the mobile terminal, then the flow goes to block 105.

Block 103: The mobile terminal sends a data request to the server via the network connection for downloading server data corresponding to the application. After the server receives the data request it sends the server data corresponding to the application to the mobile terminal.

Block 104: The mobile terminal downloads the server data corresponding to the application from the server and saves the downloaded server data to the cache of the mobile terminal to form the first cache data. The server data refers to data at the server corresponding to the cache data. Generally speaking, the server data is updated more frequently than the cache data at the mobile terminal. Under the condition that the first cache data is not in the cache, the mobile terminal will download the newest data from the server to the cache through the network connection. Establishing a network connection between an application (APP) of a mobile terminal, e.g., a smart phone, and a server is one of the basic functions of a mobile terminal (e.g., a mobile phone), which will not be elaborated here.

Block 105: If the first cache data exists in the cache, the mobile terminal checks the first cache data to determine whether the first cache data is expired. For example, this is determined by checking expiration time of the first cache data. If the first cache data is not expired, the flow goes to block 106, where the first cache data still can be used for the application. If the first cache data is expired, the flow goes to block 107, where the mobile terminal sends a data request corresponding to the first cache data to the server. The data request corresponding to the first cache data contains file description information which includes the expiration time of the first cache data. Thus, the file description information containing the expiration time is uploaded to the server so that the server can record an address of the file description information to facilitate the file description information being read at any time. In addition, the file description information includes storage time of the first cache data and the storage time is sent to the server. The storage time may be the time when the cache data is updated, i.e., update time. Then the flow then goes to block 108.

Block 108: After the server receives the data request containing the file description information corresponding to the first cache data from the mobile terminal, the server compares the expiration time included in the file description information with update time of the corresponding server data at the server to determine whether the first cache data of the application is out of date. The server may also compare the storage time with the update time of the corresponding server data at the server to determine whether the first cache data needs to be updated. If the first cache data does not need to be updated, the flow goes to block 109. If the first cache data needs to be updated, the flow goes to block 110.

Block 109: The server returns prompt information to the mobile terminal to prompt that the server data requested by the mobile terminal has existed in the cache of the mobile terminal. When the first cache data is in the cache of the mobile terminal and the first cache data does not need to be updated immediately, the server will notify the mobile terminal to continue to use the first cache data and will not resend the server data to the mobile terminal. Thus, there is no need to download server data from the server to the cache of the mobile terminal, which efficiently avoids wasting network resources and reduces network transmission traffic.

Block 110: If the first cache data is expired and needs to be updated, the server sends the server data corresponding to the application to the mobile terminal via the network connection and the mobile terminal downloads the server data corresponding to the application from the server and updates the first cache data by using the server data to form second cache data. The server data refers to data at the server corresponding to the cache data, and generally speaking, the server data is updated more frequently than the cache data at the mobile terminal. The server controls cache status and cache time of the cache at the mobile terminal so as to adjust and optimize the cache at any time.

Figure 3:
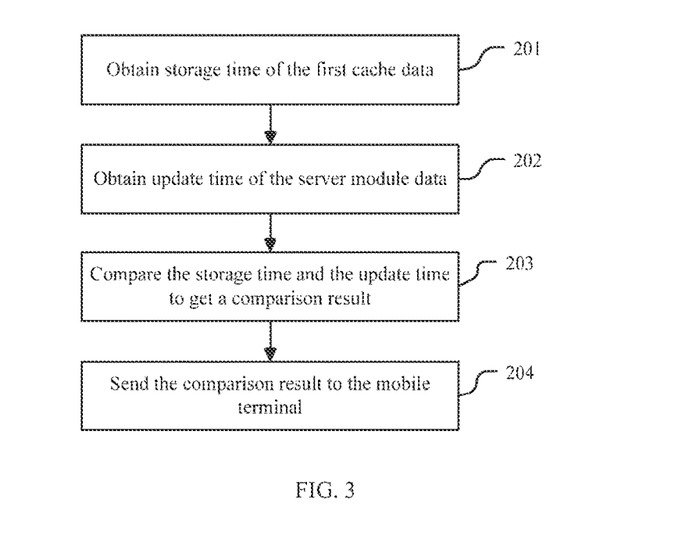
FIG. 3 shows a detailed flow chart of determining whether the first cache data is expired according to various embodiments.

FIG. 3 shows a detailed flow chart of determining whether the first cache data is expired and needs to be updated according to various embodiments of the present disclosure. In FIG. 3, the server determining whether the first cache data is expired includes the following. At block 201, the server obtains the storage time of the first cache data, i.e., the time when the first cache data was updated at the mobile terminal. At block 202, the server obtains the update time of the server data. The server data is periodically updated by the server. At block 203, the server compares the storage time and the update time, obtains a comparison result, and forms the comparison result into response data. At block 204, the server sends the comparison result, i.e., the response data, to the mobile terminal. The application on the mobile terminal analyzes the response data so as to get a return code.

Figure 4:
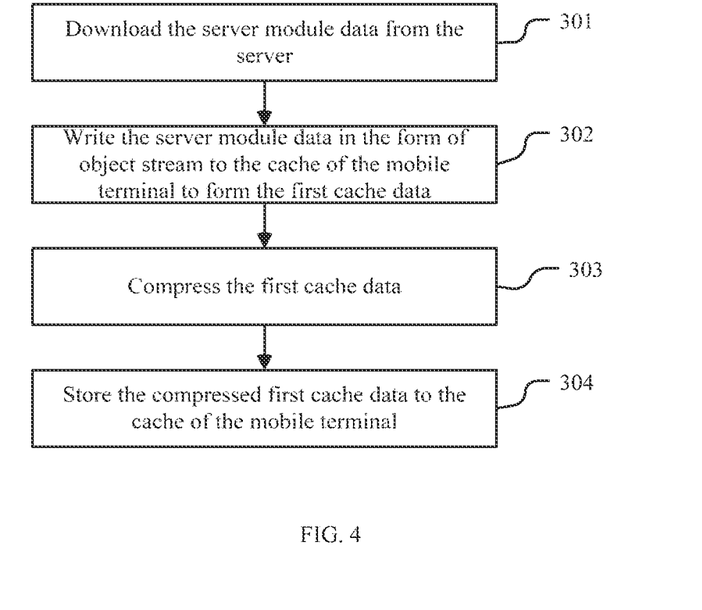
FIG. 4 shows a detailed flow chart of downloading server data from a server to a cache of the mobile terminal to form the first cache data according to various embodiments.

FIG. 4 shows a detailed flow chart of downloading the server data from the server to the cache of the mobile terminal so as to form the first cache data according to various embodiments of the present disclosure. At block 301, the mobile terminal downloads the server data from the server. At block 302, the mobile terminal writes the server data in the form of object stream to the cache thereof to form the first cache data. At block 303, the mobile terminal compresses the first cache data. At block 304, the mobile terminal stores the compressed first cache data to the cache thereof.

Figure 5:
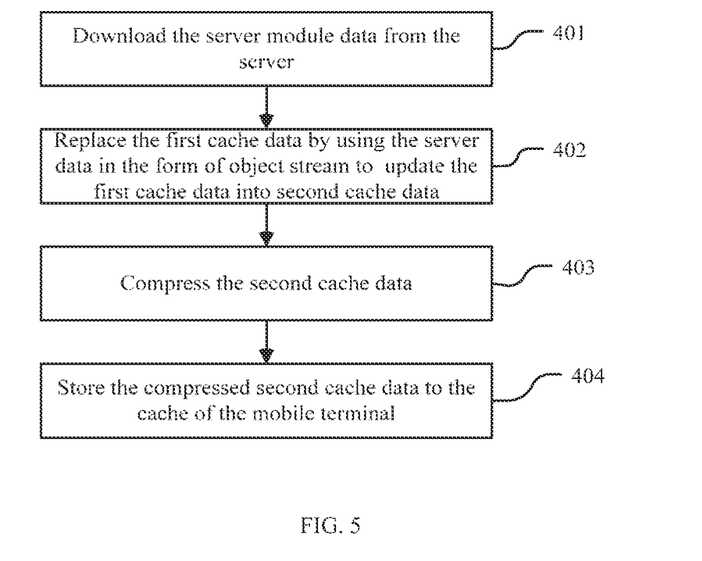
FIG. 5 shows a detailed flow chart of downloading server data from the server to the cache of the mobile terminal to form the second cache data according to various embodiments.

FIG. 5 shows a detailed flowchart of downloading the server data from the server to the cache of the mobile terminal to form the second cache data according to various embodiments of the present disclosure. At block 401, the mobile terminal downloads the server data from the server. At block 402, the mobile terminal replaces the first cache data by using the server data in the form of object stream so as to update the first cache data to the second cache data. At block 403, the mobile terminal compresses the second cache data. At block 404, the mobile terminal stores the compressed second cache data to the cache of the mobile terminal. The second cache data is in the form of object stream and is not the original file, which avoids a second analysis, increases the loading speed, and enhances the user's experience.

The application running on the mobile terminal determines whether the return code returned from the server is smaller than an overflow value. If the return code is larger than the overflow value, then information indicating that the data request of user is failed will be displayed on an interface of the application. If the return code is smaller than or equal to the overflow value, then the application determines whether the return code is a standard code or not. If the return code is a standard code, then it is determined that the first cache data is not expired. If the return code is a non-standard code, it is determined that the first cache data is expired and the application sends a data request for downloading the data from the server.

According to various embodiments, if the server determines that the cache data is not expired, the server returns a status code, e.g., "304", instead of the whole data to the APP, thus reducing the amount of data transmission.

The application displays information relevant to the first cache data or to the second cache data on the interface of the application and notifies the information to the user. When it is determined that the cache data is the most recent, the data downloading process ends. The local APP will load data according to the frequency of usage by the user to make the transition of the interface more smooth and fluent.

Various embodiments of the present disclosure also provide a system for managing cache data of a mobile terminal, so as to solve the technical issues of application software over-frequently accessing to the cache, searching cached files being slow, downloading too much data, and wasting network traffic.

The mobile terminal 10 includes memory, one or more processors, and one or more programs stored in the memory and configured for execution by the one or more processors. The one or more programs include instructions to determine whether first cache data corresponding to an application exists. If it is determined that the first cache data does not exist, send a data request to request for server data corresponding to the first cache data and download the server data and form the first cache data by using the server data.

In the mobile terminal 10, the one or more programs further include instructions to, if it is determined that the first cache data exists and if the first cache data is not expired according to expiration time of the first cache data, load the first cache data for the application.

In the mobile terminal 10, the one or more programs further include instructions to, if it is determined that the first cache data exists and if the first cache data is expired according to expiration time of the first cache data, send the data request containing storage time of the first cache data.

In the mobile terminal 10, the one or more programs further include instructions to, if it is determined that the first cache data needs to be updated, download the server data; replace the first cache data with the server data in object stream to update the first cache data into the second cache data, compress the second cache data, and save the compressed second cache data.

In the mobile terminal 10, the one or more programs further include instructions to, if it is determined that the first cache data needs not to be updated, load the first cache data for the application.

The server 20 includes memory, one or more processors, and one or more programs stored in the memory and configured for execution by the one or more processors. The one or more programs include instructions to, if first cache data corresponding to an application does not exist, receive a data request that requests for server data corresponding to the application and send the server data to form the first cache data.

In the server 20, the one or more programs further include instructions to, if the first cache data exists and if the first cache data is expired according to expiration time of the first cache data, receive the data request containing storage time of the first cache data.

In the server 20, the one or more programs further include instructions to compare update time of the server data and the storage time contained in the data request to determine whether the first cache data needs to be updated.

In the server 20, the one or more programs further include instructions to, if it is determined that the first cache data needs to be updated, send the server data to update the first cache data.

In the server 20, the one or more programs further include instructions to, if it is determined that the first cache data needs not to be updated, send a notification.

Figure 6:
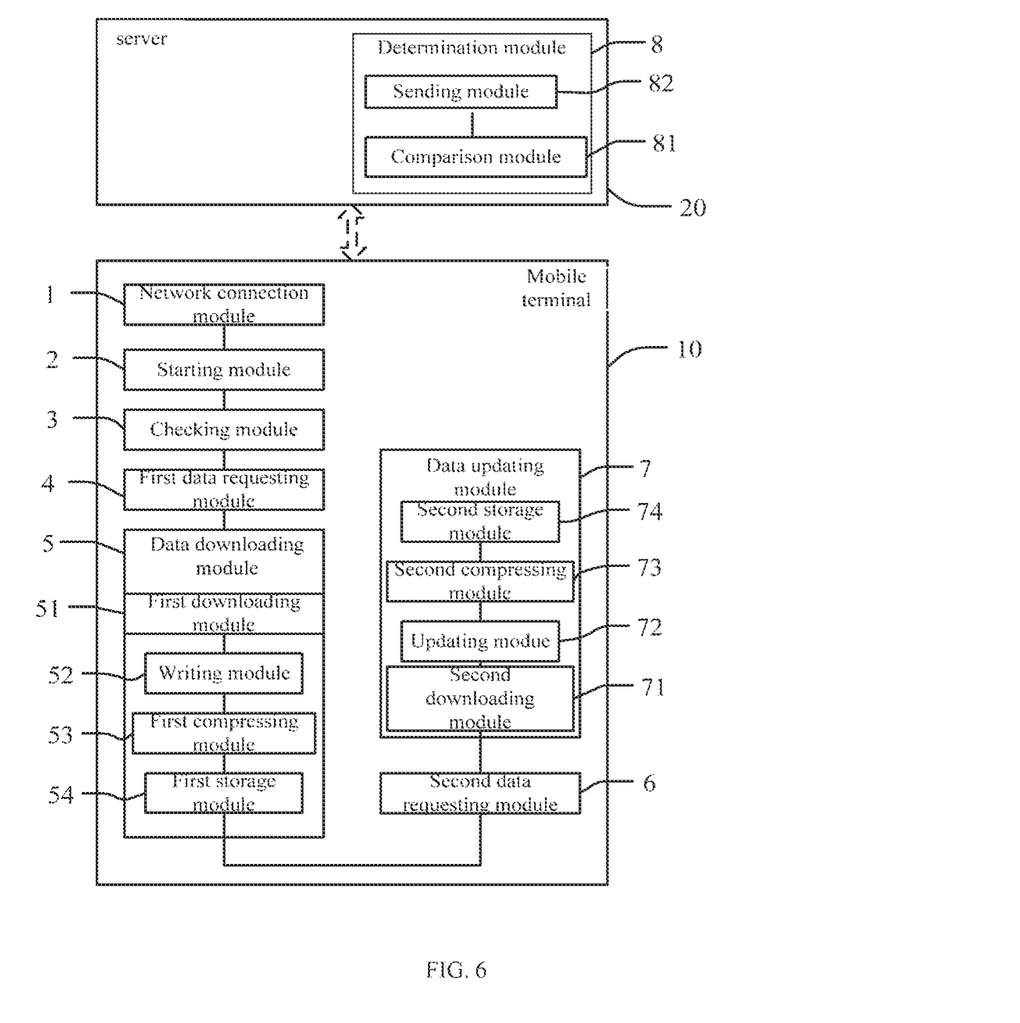
FIG. 6 shows a structural diagram of a system for managing cache data of the mobile terminal according to various embodiments.

FIG. 6 shows a structural diagram of a system for managing cache data of the mobile terminal according to various embodiments of the present disclosure.

As shown in FIG. 6, the mobile terminal 10 includes a network connection module 1 to establish a network connection between the server and the mobile terminal, a starting module 2 to start an application on the mobile terminal, a checking module 3 to check whether the first cache data corresponding to the application exists in the cache of the mobile terminal, a first data requesting module 4 to send a data request to the server for downloading data, a data downloading module 5 to download the server data corresponding to the application from the server to the cache of the mobile terminal, a second data request module 6 to send the data request corresponding to the first cache data to the server, and a data updating module 7 to download the server data corresponding to the application from the server to the cache of the mobile terminal so as to update the first cache data into the second cache data.

If the first cache data is not in the cache of the mobile terminal, the mobile terminal 10 downloads the server data to the cache thereof to form the first cache data. If the first cache data has existed in the cache of the mobile terminal 10 and the first cache data has not expired, the server 20 returns prompt information to the mobile terminal 10 to prompt that the requested data has existed in the cache of the mobile terminal 10. If the first cache data exists in the cache of the mobile terminal 10 and the first cache data has expired, the mobile terminal 10 downloads the server data from the server 20 to the cache of the mobile terminal 10 to update the first cache data into the second cache data.

The device for managing the cache data of the mobile terminal also includes a determination module 8 at the server for determining whether the first cache data is expired.

The determination module 8 includes a comparison module 81 to compare the storage time of the first cache data and the update time of the server data to get a comparison result and a sending module 82 to send the comparison result to the mobile terminal.

The data downloading module 5 includes a first downloading module 51 to download the server data from the server, a writing module 52 to write the server data in the form of object stream into the cache of the mobile terminal so as to form the first cache data, a first compression module 53 to compress the first cache data, and a first storage module 54 to save the compressed first cache data to the cache of the mobile terminal.

The data updating module 7 includes a second downloading module 71 to download the server data from the server, an update module 72 to cover the first cache data by using the server data in the form of object stream to update the first cache data into the second cache data, a second compression module 73 to compress the second cache data, and a second storage module 74 to save the compressed second cache data to the cache of the mobile terminal.

In various embodiments, in an environment where the network condition is good, the local cache can be used according to the cache situations thereof and the expiration time returned from the server, since in some conditions there is no need to re-download the server data, which reduces waste of network traffic. The cache file stored locally is in the form of object stream instead of the original file, which avoids a second analysis, improves the loading speed, and enhances the user's experience. The cache data of the mobile terminal takes precedence according to the frequency of usage by the user, which also improves the loading speed. The cache data is efficiently compressed, which reduces the storage space occupied by the cache data in the mobile terminal.

The foregoing description, for purpose of explanation, has been described with reference to various embodiments. However, the illustrative discussions above are not intended to be exhaustive or to limit the present disclosure to the precise forms disclosed. Many modifications and variations are possible in view of the above. The various embodiments were chosen and described in order to best explain the principles of the present disclosure and its practical applications, to thereby enable others skilled in the art to best utilize the present disclosure and various embodiments with various modifications as are suited to the particular use contemplated.

The various embodiments may be implemented by hardware, software, firmware, or a combination thereof. For example the various methods, processes, and functional modules described herein may be implemented by a processor (the term processor should be interpreted broadly to include a CPU, processing unit/module, ASIC, logic module, or programmable gate array, etc.). The processes, methods, and functional modules may all be performed by a single processor or split between several processors. Reference in this disclosure or the claims to a 'processor' should thus be interpreted to mean 'one or more processors'. The processes, methods, and functional modules are implemented as machine readable instructions executable by one or more processors, hardware logic circuitry of the one or more processors or a combination thereof. The modules, if mentioned in the aforesaid examples, may be combined into one module or further divided into a plurality of submodules. Further, the various embodiments disclosed herein may be implemented in the form of a software product. The computer software product is stored in a non-transitory storage medium and includes a plurality of instructions for making an electronic device implement the method recited in the examples of the present disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

What is claimed is:

1. A method for managing cache data, implemented on a terminal device, comprising:
   determining whether first cache data corresponding to an application on the terminal device exists on the terminal device; and
   in response to determining that the first cache data does not exist on the terminal device,
   sending a data request to request for server data corresponding to the first cache data; and
   downloading the server data and forming the first cache data by using the downloaded server data;
   wherein the method further comprises:
   in response to determining that the first cache data exists on the terminal device, and in response to determining that the first cache data is not expired according to expiration time of the first cache data, loading the first cache data for the application.

2. The method according to claim 1, further comprising:
   in response to determining that the first cache data exists on the terminal device, and in response to determining that the first cache data is expired according to expiration time of the first cache data,
   sending the data request containing storage time of the first cache data;
   determining whether the first cache data needs to be updated,
   in response to determining that the first cache data needs to be updated, updating the first cache data into second cache data, or
   in response to determining that the first cache data does not need to be updated, loading the first cache data for the application.

3. The method according to claim 2, wherein determining whether the first cache data needs to be updated comprises:

comparing update time of the server data and the storage time contained in the data request.

4. The method according to claim 2, wherein updating the first cache data into the second cache data comprises,
downloading the server data;
replacing the first cache data with the server data in object stream to update the first cache data into the second cache data;
compressing the second cache data; and
saving the compressed second cache data.

5. The method according to claim 4, comprising in response to determining that the first cache data needs not to be updated,
providing the determination result.

6. A mobile terminal, comprising
memory;
one or more processors; and
one or more programs stored in the memory and configured for execution by the one or more processors, the one or more programs including instructions to:
determine whether first cache data corresponding to an application on the mobile terminal exists on the mobile terminal; and
in response to determining that the first cache data does not exist on the mobile terminal,
send a data request to request for server data corresponding to the first cache data, and
download the server data and form the first cache data by using the server data;
wherein the one or more programs further comprise instructions to:
in response to determining that the first cache data exists on the mobile terminal, and in response to determining that the first cache data is not expired according to expiration time of the first cache data, load the first cache data for the application.

7. The mobile terminal according to claim 6, wherein the one or more programs further comprising instructions to:
in response to determining that the first cache data exists on the mobile terminal, and in response to determining that the first cache data is expired according to expiration time of the first cache data,
send the data request containing storage time of the first cache data;
determine whether the first cache data needs to be updated,
in response to determining that the first cache data needs to be updated, update the first cache data into second cache data, or
in response to determining that the first cache data does not need to be updated, load the first cache data for the application.

8. The mobile terminal according to claim 7, wherein the one or more programs comprise instructions to: in response to determining that the first cache data needs to be updated,
download the server data;
replace the first cache data with the server data in object stream to update the first cache data into the second cache data;
compress the second cache data; and
save the compressed second cache data.

9. A server, comprising
memory;
one or more processors; and
one or more programs stored in the memory and configured for execution by the one or more processors, the one or more programs including instructions to:
in response to first cache data corresponding to an application on a terminal device not existing on the terminal device;
receive a data request that requests for server data corresponding to the application; and
send the server data to form the first cache data;
wherein the one or more programs further comprise instructions to;
in response to the first cache data existing on the terminal device, and in response to the first cache data being expired according to expiration time of the first cache data, receive the data request containing storage time of the first cache data, compare update time of the server data and the storage time contained in the data request to determine whether the first cache data needs to be updated;
in response to determining that the first cache data needs to be updated, send the server data to update the first cache data; or
in response to determining that the first cache data does not need to be updated, send a notification.

* * * * *